Oct. 28, 1930.  F. J. OSBORN ET AL  1,780,034
FRAME AND STEERING MEANS FOR MOTOR CYCLES AND LIKE VEHICLES
Filed Jan. 15, 1930  2 Sheets-Sheet 1

Inventors:
Frederick J. Osborn
Norman F. Wood
By Richard E. Babcock
Attorney

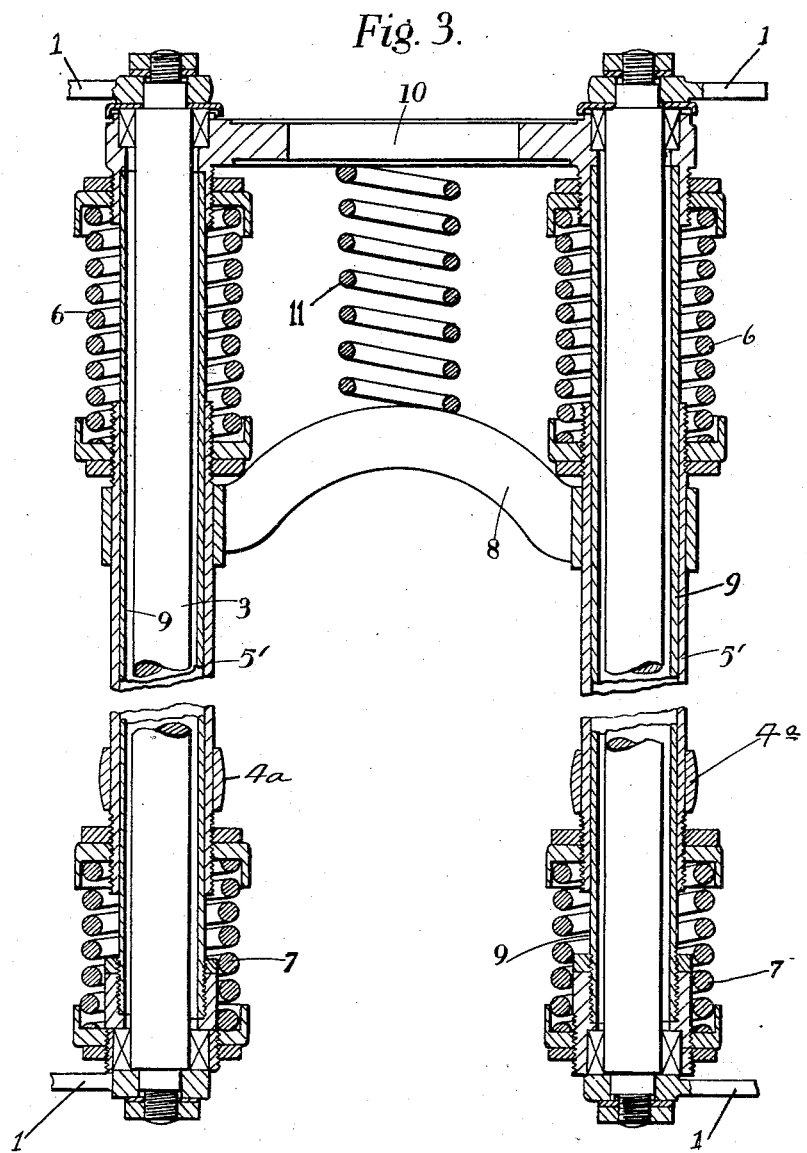

Patented Oct. 28, 1930

1,780,034

UNITED STATES PATENT OFFICE

FREDERICK JOHN OSBORN AND NORMAN FREDERICK WOOD, OF GOSPORT, ENGLAND

FRAME AND STEERING MEANS FOR MOTOR CYCLES AND LIKE VEHICLES

Application filed January 15, 1930, Serial No. 420,992, and in Great Britain January 2, 1929.

The present invention relates to that type of frame for motor cycles and the like wherein steering is accomplished by swinging a pair of links about axes on the frame, the links converging towards the steering wheel and having their outer ends pivoted to the wheel-carrying means. An example of such steering is given in our U. S. patent specification No. 1,715,246.

In the present invention, a pair of link structures or the like are pivoted to swing about axes on the frame, and the steering wheel axle is carried by a rigid frame or structure which spaces or assists in spacing the outer ends of the link-structures, and is slidable relative thereto against load-carrying springs in a direction substantially parallel to the link-structure axes.

Figure 1:
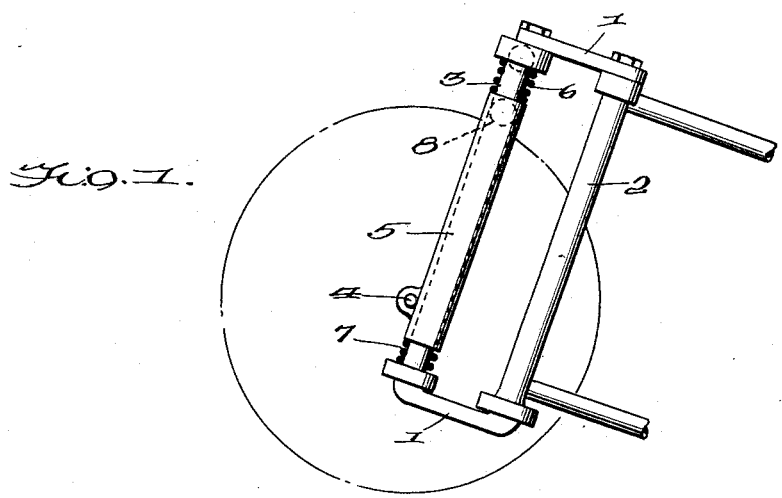
Figure 4:
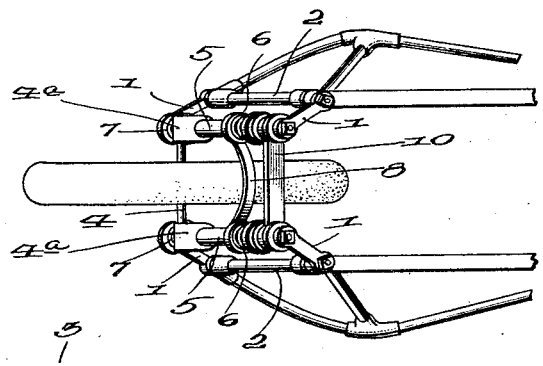
Figure 2:
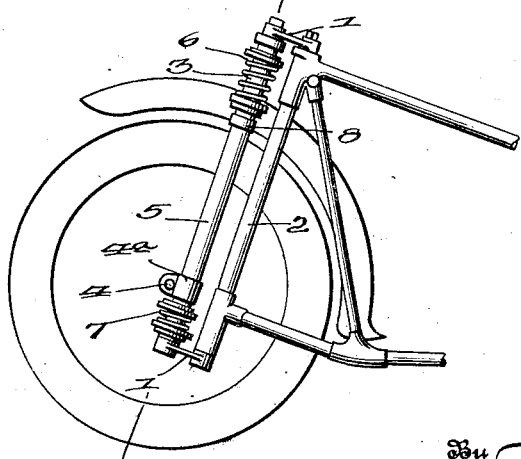

In the accompanying drawings:

Figure 1 represents a fragmentary side elevation of the front portion of a motor cycle frame and steering assemblage embodying one form of my invention;

Figure 2, a view similar to Figure 1, illustrating the preferred form of my invention;

Figure 3, a sectional view on the line 3—3 of Fig. 2, the steering wheel and mud-guard being omitted; and Figure 4, a fragmentary top plan view of the preferred form, the mud-guard being omitted.

In the embodiment illustrated in Figure 1, links 1 are secured to each end of a comparatively long steering column on each side of the frame pivoted within the steering heads 2, and are connected at their outer ends by tie-rods 3 to form the said swinging structures. These structures may have either rearward rake as shown, or be vertical or have forward rake, and the links 1 may extend forwardly or rearwardly from the steering heads 2. The steering wheel axle 4 is then carried by a pair of sleeves 5 sliding on the rods 3 against load springs 6 with or without rebound springs 7. The sleeves 5 extend upwardly sufficiently to be rigidly connected together above the wheel by a bridge 8. Sleeves 5, axle 4, and bridge 8, thus form a rigid frame or structure sliding on the tie-rods 3.

The preferred embodiment of the invention, however, consists in a modification of the above arrangement wherein tubes 9 are respectively disposed concentrically about, and extend axially of, the tie-rods 3 so as to be pivotally connected thereto or therewith to turn concentrically about the axes thereof respectively, as illustrated in Fig. 2 and in more detail on an enlarged scale in Fig. 3.

The respective sleeves 5' of the rigid wheel carrying frame are respectively concentrically disposed about the respective tubes 9 to be in substantially free sliding contact therewith at all points of the length of said sleeves 5' respectively, and said sleeves 5' are connected above or over the steering-wheel by a rigid bridge 8 which spans the wheel, as illustrated in Fig. 4, and is rigidly connected to each of said sleeves 5', while the lower portions of said sleeves 5' are connected together by the steering-wheel axle 4, the respective end portions of which are connected to or journaled in the respective collars 4$^a$ respectively rigid with the lower portions of the respective sleeves 5'.

The upper end portions of the sleeves 9 are respectively received in the respective downwardly presented concentric sockets of the respective end portions of the spacing and connecting link 10, as best shown in Fig. 3, which link 10 has its respective end portions bored concentric with the respective sockets to receive and provide bearings for the upper end portions of the respective tie-rods 3, and suitable anti-friction bearing means, diagrammatically indicated in Fig. 3, may be provided for said tie-rods 3 in the respective end portions of said link 10 and in the lower end portions of the respective tubes 9, and the links 1 will have their outer end portions bored to receive and fit about the shouldered end portions of the respective tie-rods 3 and will be held thereon for partial rotation or turning movement therewith by suitable nuts, all as illustrated in detail in Fig. 3.

The load springs 6 are respectively disposed about the upper portions of the respective tubes 9 and interposed between upper spring cups carried by the respective sockets of the link 10 and the respective opposed lower cups carried by the respective sleeves 5' of the rigid steering-wheel carrying frame, and rebound springs 7 preferably are provided and similarly disposed about the respective lower portions of the sleeves 9 and interposed thereabout between pairs of similar opposed cups respectively carried by the lower end portions of the sleeves 5' and the tubes 9 respectively.

An additional load spring 11 may be interposed between the bridge 8 and the link 10, as illustrated in Fig. 3. However, this obviously is not essential, nor are the rebound springs 7.

In operation the respective tie-rods 3 are immovable with relation to their respective pairs of links 1, but will move therewith in an arc, and will be held in definite spaced relation to each other by the link 10 and the rigid steering-wheel carrying frame comprising the sleeves 5' rigidly connected by and to the rigid bridge 8.

As the tie-rods 3 are swung by the links 1 laterally to one side or the other in an arc the end portions of link 10 and the tubes 9 will respectively be free to, and will, turn or pivot on their axes about the respective tie-rods 3, while the respective sleeves 5' will be free to turn or pivot about the tubes 9 and, consequently, about the concentric tie-rods 3, and to slide axially of the tubes 9 and tie-rods 3 respectively under the influence of road shocks and jars as opposed and modified by the load springs 6 and rebound springs 7, which will function in usual known manner.

What we claim as our invention and desire to secure by Letters Patent is:—

1. In a motor cycle or like frame having steering means comprising pairs of links pivoted to the frame and converging towards the steering wheel and joined at their outer ends by tie-rods, spacing means for said tie-rods comprising in combination tubes pivoted thereon and joined at one end by a link, and sleeves sliding on said tubes and joined by the steering-wheel axle and by a rigid bridge over the wheel, said bridge being rigidly connected to each of said sleeves.

2. In a motor cycle or like frame having steering means comprising pairs of links pivoted to the frame and converging towards the steering wheel and joined at their outer ends by tie-rods, spacing means for said tie-rods comprising in combination tubes pivoted thereon and joined at one end by a link, sleeves sliding on said tubes and joined by the steering wheel axle and by a rigid bridge over the wheel, and a load spring located between said bridge and said link, said bridge being rigidly connected to each of said sleeves.

3. A motor cycle frame comprising a main frame, a rigid steering-wheel carrying frame, a pair of links respectively pivoted to said main frame and to said rigid frame, and load-carrying cushioning means carried by said links, said rigid frame bridging the steering-wheel and being adapted to slide co-axially with the pivots of said links on said rigid frame, and said cushioning means engaging said rigid frame.

4. A motor cycle or like frame having steering means comprising a pair of structures pivoted to swing about axes on the frame and converging towards the wheel to be steered, in combination with a rigid wheel-carrying frame bridged over said wheel and pivoted to said structures and adapted to slide on said structures substantially parallel to the pivotal attachment of said wheel frame to said structures.

5. A motor cycle or like frame having steering means comprising a pair of link structures pivoted to swing about axes on the frame and converging towards the steering wheel, each said link structure comprising a rod extending substantially parallel to the respective swinging axes of said link structures, in combination with a rigid steering-wheel carrying frame consisting of sleeves respectively disposed about, and adapted to have movement axially of, said rods, a rigid bridge rigidly connected to each of said sleeves, and an axle for said wheel, said axle having its respective end portions connected to the respective sleeves.

6. In a motor cycle or like frame having steering means comprising pairs of links pivoted to the frame and converging towards the steering wheel and joined at their outer ends by tie-rods, spacing means for said tie-rods comprising in combination tubes pivoted on said tie-rods respectively, a link connecting the upper end portions of said tubes, sleeves respectively slidably mounted on said tubes respectively and joined by the steering-wheel axle, and a rigid bridge rigidly connected to each of said sleeves and spanning the intervening portion of the steering-wheel.

In testimony whereof we affix our signatures.

FREDERICK JOHN OSBORN.
NORMAN FREDERICK WOOD.